(12) United States Patent
Yamaguchi et al.

(10) Patent No.: US 7,762,367 B2
(45) Date of Patent: Jul. 27, 2010

(54) STRADDLE-TYPE VEHICLE

(75) Inventors: Masaya Yamaguchi, Shizuoka (JP); Shigeto Yamasaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 363 days.

(21) Appl. No.: 11/765,321

(22) Filed: Jun. 19, 2007

(65) Prior Publication Data

US 2008/0006458 A1 Jan. 10, 2008

(30) Foreign Application Priority Data

Jun. 23, 2006 (JP) ............... 2006-174115
Dec. 26, 2006 (JP) ............... 2006-350295

(51) Int. Cl.
*B60K 11/04* (2006.01)

(52) U.S. Cl. ............... 180/68.1; 180/68.4; 165/149

(58) Field of Classification Search ............... 165/98, 165/99, 149; 180/68.1, 68.4, 68.5, 68.6
See application file for complete search history.

(56) References Cited

U.S. PATENT DOCUMENTS

| | | | | |
|---|---|---|---|---|
| 4,019,595 A | * | 4/1977 | Imai et al. ............... | 180/229 |
| 4,169,501 A | * | 10/1979 | Takeuchi et al. ............ | 165/126 |
| 4,570,740 A | * | 2/1986 | Hara ........................... | 180/229 |
| 4,667,758 A | * | 5/1987 | Tamura ..................... | 180/68.4 |
| 4,673,032 A | * | 6/1987 | Hara et al. ..................... | 165/44 |
| 5,715,904 A | * | 2/1998 | Takahashi et al. ........... | 180/229 |
| 5,984,035 A | * | 11/1999 | Katoh et al. ............... | 180/68.1 |
| 6,102,149 A | * | 8/2000 | Suzuki et al. ............... | 180/229 |
| 7,150,334 B2 | * | 12/2006 | Kodan et al. ............... | 180/68.4 |
| 2003/0066697 A1 | * | 4/2003 | Kodan et al. ............... | 180/68.4 |
| 2004/0188156 A1 | * | 9/2004 | Karube et al. ............. | 180/68.4 |
| 2004/0255909 A1 | * | 12/2004 | Kurokawa et al. .......... | 123/472 |
| 2006/0254844 A1 | * | 11/2006 | Nakashima et al. ......... | 180/229 |

FOREIGN PATENT DOCUMENTS

JP 11-208557 8/1999

\* cited by examiner

*Primary Examiner*—Lesley Morris
*Assistant Examiner*—Erez Gurari
(74) *Attorney, Agent, or Firm*—Keating & Bennett, LLP

(57) ABSTRACT

A motorcycle that ensures engine cooling efficiency while suppressing radiator exposure has a head pipe and left and right downtubes extending downward from the head pipe. A radiator catches traveling wind from forwardly of the motorcycle. A louver provided on the radiator includes baffle plates that lead traveling wind to the radiator. The radiator has an overlapping portion between the downtubes that overlaps the downtubes as viewed from laterally of the motorcycle.

15 Claims, 9 Drawing Sheets

STRADDLE-TYPE VEHICLE

RELATED APPLICATIONS

This application claims the benefit of priority under 35 USC 119 of Japanese patent application no. 2006-174115, filed on Jun. 23, 2006, and Japanese patent application no. 2006-350295, filed on Dec. 26, 2006, which applications are hereby incorporated by reference in their entireties.

BACKGROUND OF THE INVENTION

1. Field of the Invention

The present invention relates to a straddle-type vehicle, and in particular to a louver provided on the radiator of the straddle-type vehicle to lead a traveling wind to the radiator.

2. Description of Related Art

A conventional American type motorcycle, which has a low seat and on which a rider throws out both legs in a riding position, uses an engine (an air-cooling type engine) cooled by a traveling wind. Since there is little traveling wind when stopped or traveling at low-speeds, however, an air-cooling type engine is sometimes not adequately cooled as compared to a water-cooling type engine.

Some American straddle-type vehicles are instead provided with a water-cooling type engine (see, for example, JP-A-11-208557). Because the radiator is exposed in order to catch the traveling wind, a straddle-type vehicle provided with a water-cooling type engine is considerably different in outward appearance from a straddle-type vehicle provided with an air-cooling type engine. However, if exposure of the radiator is suppressed to obtain an outward appearance like a straddle-type vehicle with an air-cooling type engine, it has not been possible to obtain adequate cooling efficiency.

SUMMARY OF THE INVENTION

The invention has been thought of in view of this problem and provides a straddle-type vehicle that ensures engine cooling efficiency while suppressing exposure of the radiator, without the provision of a cowling.

A straddle-type vehicle according to the invention comprises a head pipe and a pair of left and right downtubes extending downward from the head pipe. A radiator catches a traveling wind from forwardly of the vehicle. A louver is provided on at least a part of the radiator to lead traveling wind to the radiator. At least a part of the radiator includes an overlapping portion provided between the pair of left and right downtubes, as viewed in front view of the vehicle, that overlaps the downtube along the downtube as viewed from laterally of the vehicle.

With such a straddle-type vehicle, at least a part of the radiator is provided between the pair of left and right downtubes as viewed in front view of the vehicle. Also, at least a part of the radiator includes an overlapping portion, which overlaps the downtube along the downtube as viewed from laterally of the vehicle.

Since at least a part of the radiator is hidden between the pair of left and right downtubes, exposure of the radiator is suppressed. Also, since the louver is provided on at least a part of a front portion of the radiator, traveling wind is effectively led to the radiator to ensure engine cooling efficiency. Accordingly, engine cooling efficiency is ensured while exposure of the radiator is suppressed, without the provision of a cowling.

The invention also comprises a front wheel provided forwardly of the radiator, a front fender provided arcuately along an outer periphery of the front wheel to extend rearwardly of the front wheel from thereabove, and a headlight provided above the front fender. The louver includes a plurality of baffle plates provided in a vehicle width direction and aligned at predetermined intervals in a vertical direction. At least a part of the baffle plates is directed between the front fender and the headlight as viewed from laterally of the vehicle.

Another feature of the invention is that the baffle plates are directed along a straight line that is tangent to the front fender.

Another feature of the invention is that, as viewed from laterally of the vehicle, a width of the baffle plates in an upper portion of the louver is greater relative to the width of the baffle plates in a lower portion of the louver.

Another feature of the invention is that the louver includes a pair of connecting members that connect the upper and lower baffle plates together, as viewed in front view of the vehicle.

Another feature of the invention comprises a rear wheel, an engine provided rearwardly of the radiator as a power source for the rear wheel, an exhaust pipe connected to the engine, and a cooling fan that sends air to the radiator. As viewed from laterally of the vehicle, the exhaust pipe is provided between an upper half of the radiator and the engine. At least a part of the exhaust pipe is provided substantially centrally of the radiator in the vehicle width direction as viewed in front view of the vehicle, a distance to one of the connecting members from the other of the connecting members in the vehicle width direction enlarges downward from above, and the cooling fan is provided below the radiator.

Another feature of the invention comprises a bracket, at least a part of which is bent. One end of the bracket is connected to a side of the radiator, and the other end of the bracket overlaps the radiator as viewed in front view of the vehicle.

Another feature of the invention is that the louver is connected to the other end of the bracket from forwardly of the bracket.

Another feature of the invention is that, as viewed from laterally of the vehicle, a width of the downtube is longer than a distance to a front end of the downtube from a front end of the louver. The louver includes an overlapping portion provided along the downtube.

Another feature of the invention is that as viewed from laterally of the vehicle, the whole radiator overlaps the downtube.

Another feature of the invention is that the baffle plates direct a direction of a traveling wind flowing along an upper portion of the front fender.

According to the invention, a straddle-type vehicle that ensures engine cooling efficiency while suppressing exposure of a radiator without provision of a cowling is provided.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of a straddle-type vehicle according to the invention is now described with reference to the drawings. Same or similar parts in the following figures are denoted by same or similar reference numerals. It should be understood that the drawings are schematic and that ratios of dimensions are different from those of actual ones. Actual dimensions should be determined taking the following description into consideration. Also, there are parts having dimensional relationships and ratios that are different from one another among the figures.

(Construction of a Straddle-Type Vehicle According to the Embodiment)

Figure 1:
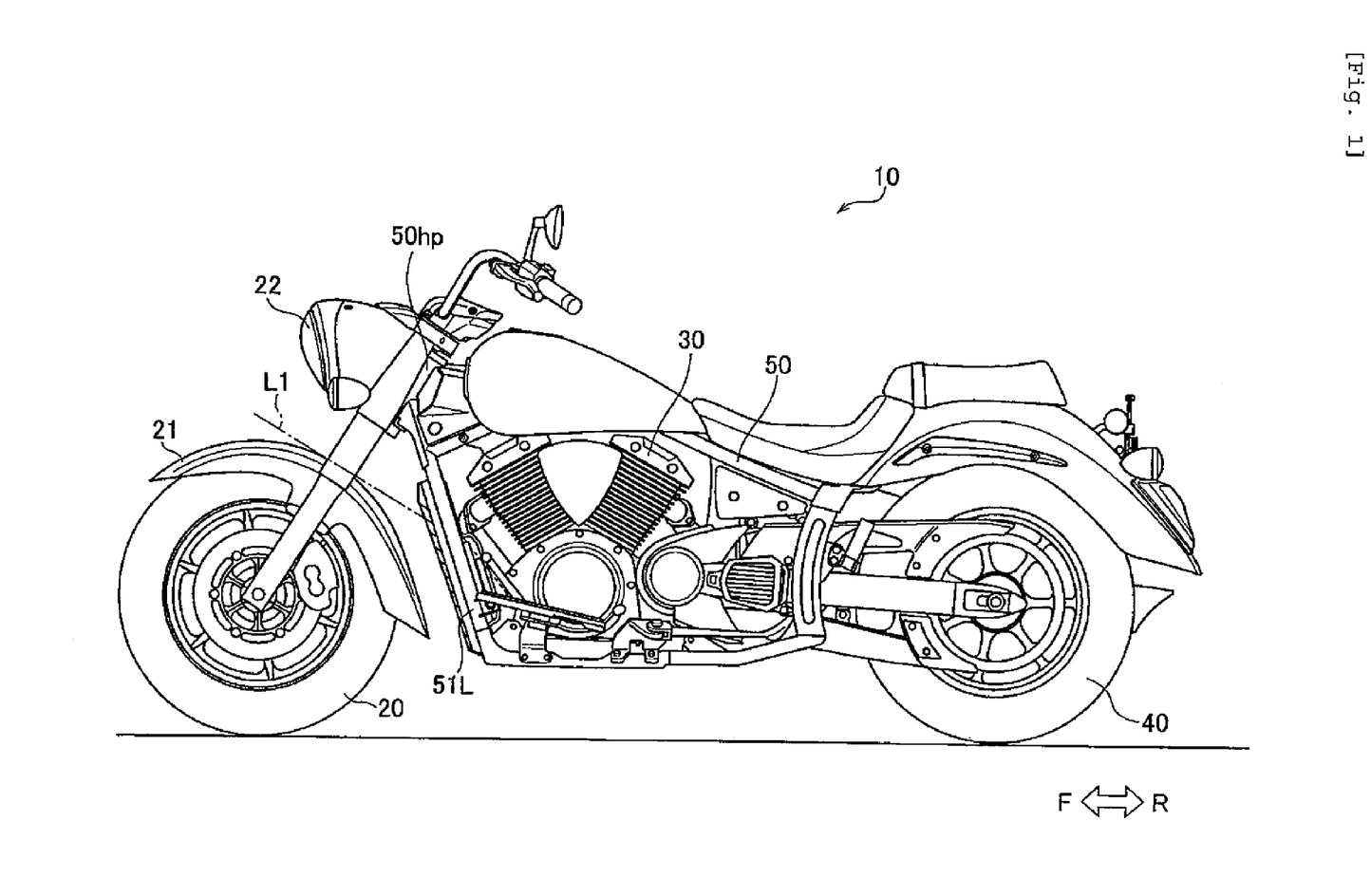
FIG. 1 is a left side view of a motorcycle according to an embodiment of the invention.
Figure 2:
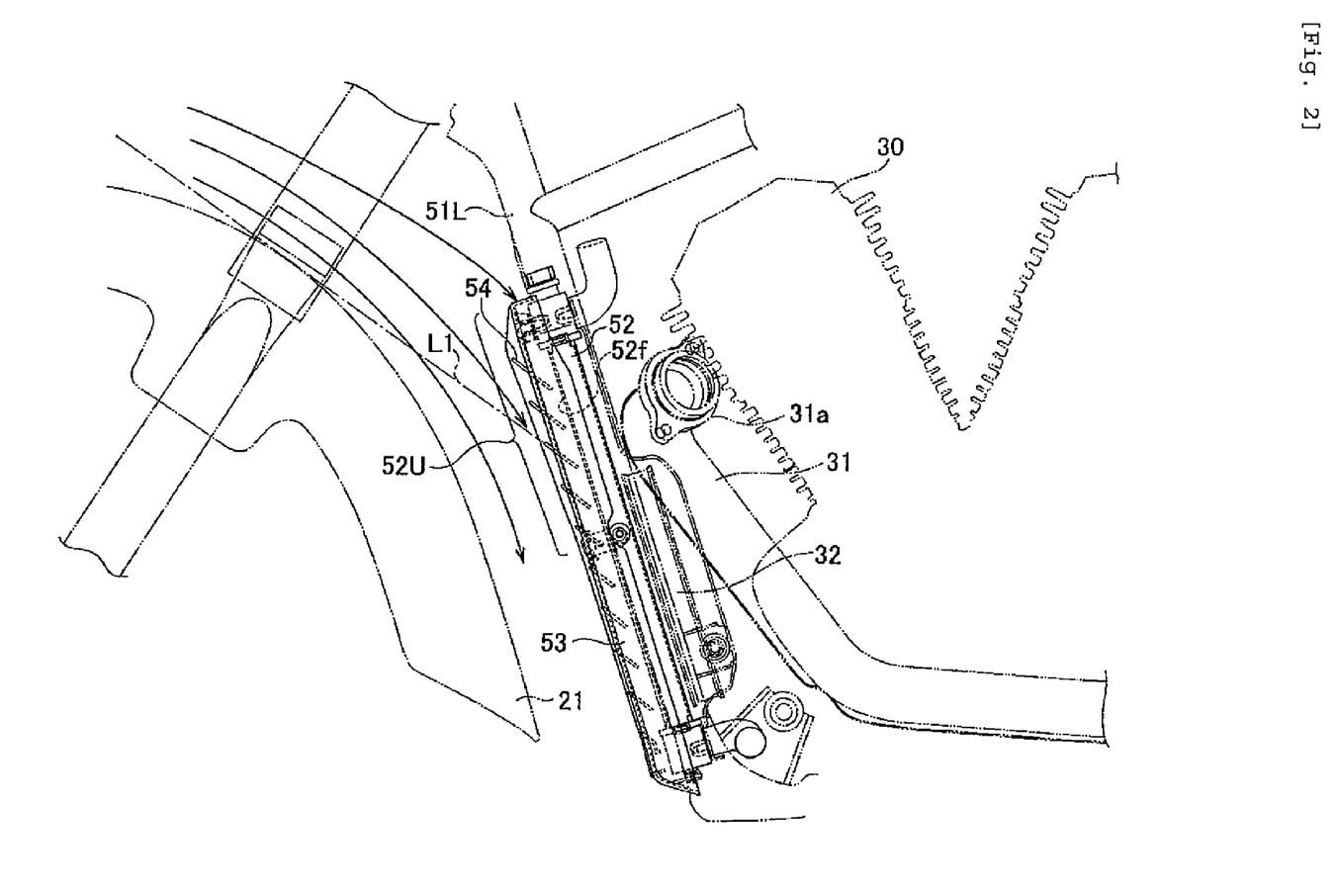
FIG. 2 is a partially enlarged left side view of the motorcycle.

A straddle-type vehicle according to the invention, embodied as a motorcycle 10, is described with reference to FIGS. 1 and 2. FIG. 1 is a left side view of motorcycle 10 and FIG. 2 is a left enlarged side view of a portion of motorcycle 10.

Motorcycle 10 comprises a front wheel 20, a rear wheel 40 and a V-type engine 30 that drives rear wheel 40. A front fender 21 is provided arcuately along an outer periphery of front wheel 20 to extend rearwardly of front wheel 20 from thereabove. Motorcycle 10 is a so-called American type motorcycle, on which a rider throws out both legs in a riding position.

Engine 30 is mounted to body frame 50 of motorcycle 10. Body frame 50 includes a head pipe 50hp and a pair of left and right downtubes 51L and 51R in a vehicle width direction of motorcycle 10. A headlight 22 is provided forwardly of head pipe 50hp and above front fender 21.

A radiator 52 (FIG. 2) is provided between downtubes 51L and 51R. In the following description, features common to downtubes 51L and 51R are described with respect to only downtube 51L. A straight line L1 (described later) is tangential to front fender 21 and extends forwardly of radiator 52.

As shown in FIG. 2, a louver 53 for leading traveling wind to radiator 52 is provided on at least a part of a radiator front 52f, which is a front portion of radiator 52 in the form of a flat plate. Louver 53 includes a plurality of baffle plates 54, at least a part of which are directed along straight line L1 which is tangential to front fender 21.

An exhaust pipe 31 extends from engine 30 to the rear of motorcycle 10 from rightwardly laterally of a front bank. Exhaust gases discharged from engine 30 are led through exhaust pipe 31 to a muffler (not shown) at the rear of motorcycle 10. A part of exhaust pipe 31 is provided between a radiator upper half 52U and engine 30. A cooling fan 32 is provided behind radiator 52 and below exhaust pipe 31. Exhaust pipe 31 includes a manifold 31a connected to engine 30. Cooling fan 32 comprises a plurality of fans (not shown) rotated with electricity to send air to radiator 52.

(Detailed Construction Around the Radiator)

Figure 3:
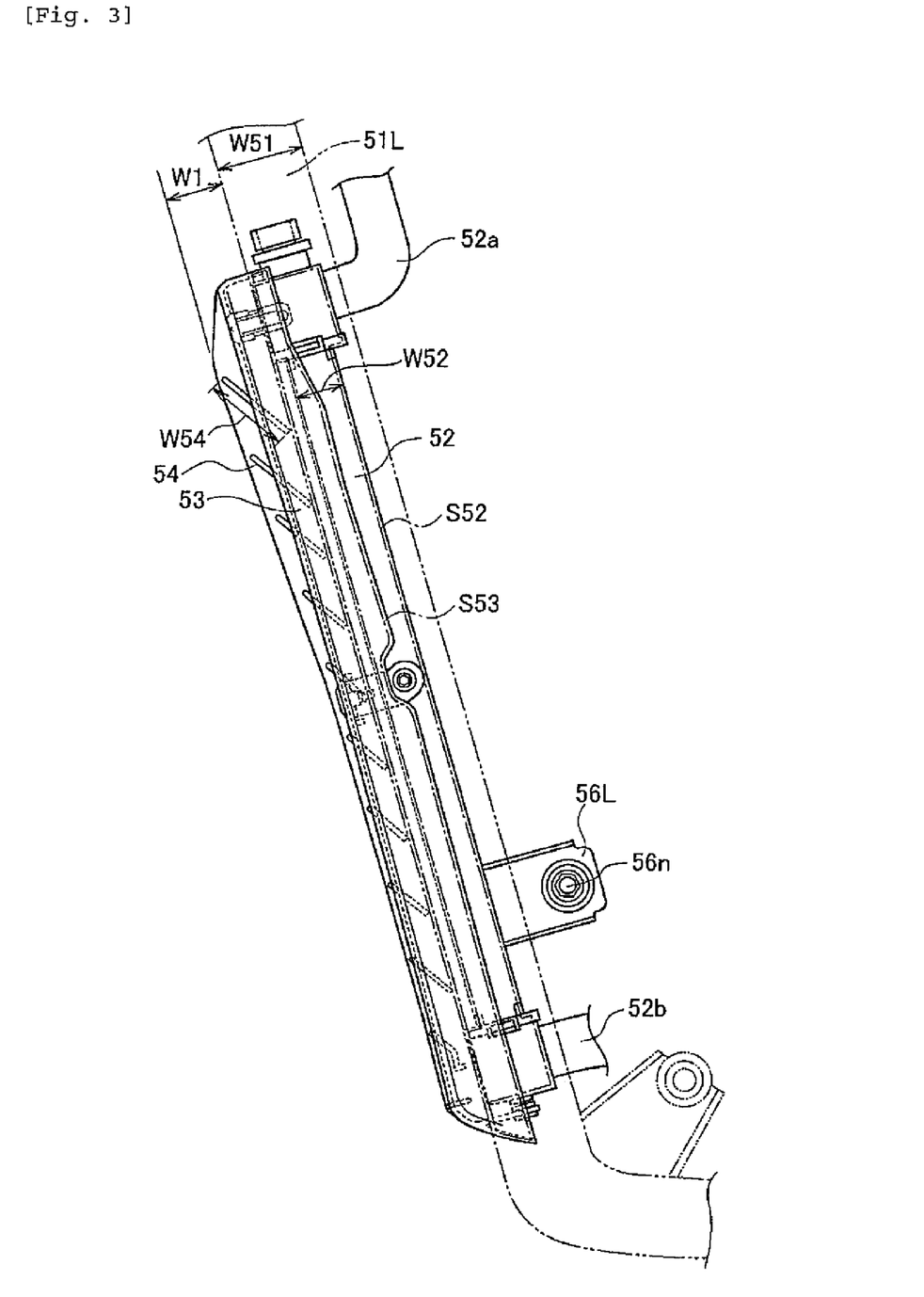
FIG. 3 is an enlarged view of a neighborhood of a radiator provided on the motorcycle.
Figure 4:
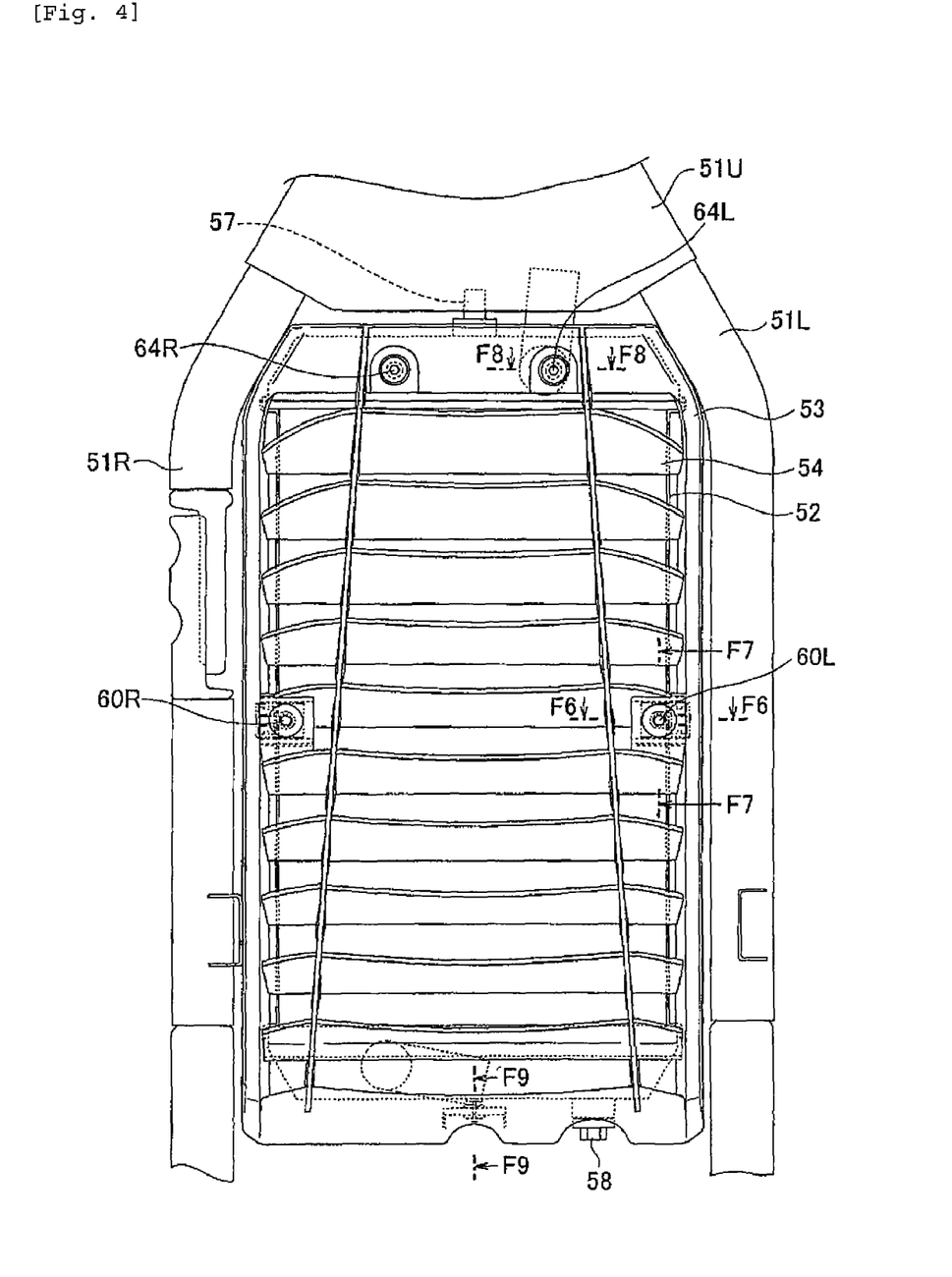
FIG. 4 is a plan view of the neighborhood of the radiator.

The construction around radiator 52, which is an essential part of the invention, is described with reference to FIGS. 3 and 4. FIG. 3 is a left side view of radiator 52 and its periphery. FIG. 4 is a front view of radiator 52 and its periphery. In FIG. 3, downtube 51L is indicated by imaginary lines in order to clarify its positional relationship with radiator 52.

(1) Construction of the Radiator

Cooling water flows through radiator 52 via radiator hoses 52a and 52b. Radiator 52 is provided between downtubes 51L and 51R as viewed from the front of motorcycle 10 (FIG. 4). An overlapping portion S52 of radiator 52 overlaps downtube 51L along downtube 51L as viewed from laterally of motorcycle 10. In one embodiment, the whole radiator 52 overlaps downtube 51L. Radiator 52 is provided between a front end and a rear end of downtube 51L as viewed from laterally of motorcycle 10. Radiator front portion 52f is substantially perpendicular to a longitudinal direction of motorcycle 10.

As shown in FIG. 3, radiator 52 is fixed to downtube 51L by means of a bracket 56L, which extends rearward from radiator 52. Downtube 51L comprises a bracket having a hole in a position overlapping a hole in bracket 56L. The holes of the two brackets are connected by a bracket mount vis 56n to fix radiator 52 to downtube 51L. As can be seen in FIG. 3, the width W52 of radiator 52 is less than the width W51 of downtube 51L.

As shown in FIG. 4, a downtube cover 51U provided above downtubes 51L and 51R has an opening into which radiator 52 is inserted. A rubber grommet 57 is press fitted into the opening. A projection (not shown) formed on an upper end of radiator 52 projects toward and is connected to downtube cover 51U through grommet 57.

A mount hole (not shown) is provided at a lower end of radiator 52. A bolt 58 (twisted body) extending through body frame 50 (FIG. 1) is inserted into the mount hole to connect radiator 52 and body frame 50.

(2) Construction of the Louver

As shown in FIG. 3, louver 53 is provided on at least a part of radiator front portion 52f. In one embodiment, louver 53 covers the whole radiator front portion 52f. Louver 53 includes overlapping portion S53 provided along downtube 51L and a plurality of plate-shaped baffle plates 54. Baffle plates 54 have a longitudinal direction along the vehicle width direction of motorcycle 10 and are aligned at predetermined intervals in a vertical direction of motorcycle 10.

As shown in FIGS. 1 and 2, at least a part of baffle plates 54 is directed between front fender 21 and headlight 22 in the direction of straight line L1, which is tangent to front fender 21. Also, at least a part of baffle plates 54 is directed in a direction (an arrow in FIG. 2) of traveling wind flowing along an upper portion of front fender 21 so as to scoop the traveling wind flowing along the upper portion of front fender 21 and direct it downward.

As viewed from laterally of motorcycle 10 (FIG. 3), the width W54 of baffle plates 54 increases from a lower portion of louver 53 to an upper portion of louver 53 (i.e., the width of the upper baffle plates is greater than the width of the lower baffle plates). In addition, downtube width W51 is greater than a distance W1 to the front end of downtube 51L from a front end of louver 53.

As shown in FIG. 4, louver 53 includes a rivet 60L, a rivet 60R, a louver mount vis 64L, and a louver mount vis 64R, which fix louver 53 from forwardly of motorcycle 10.

(3) Construction of the Exhaust Pipe and the Cooling Fan

Figure 5:
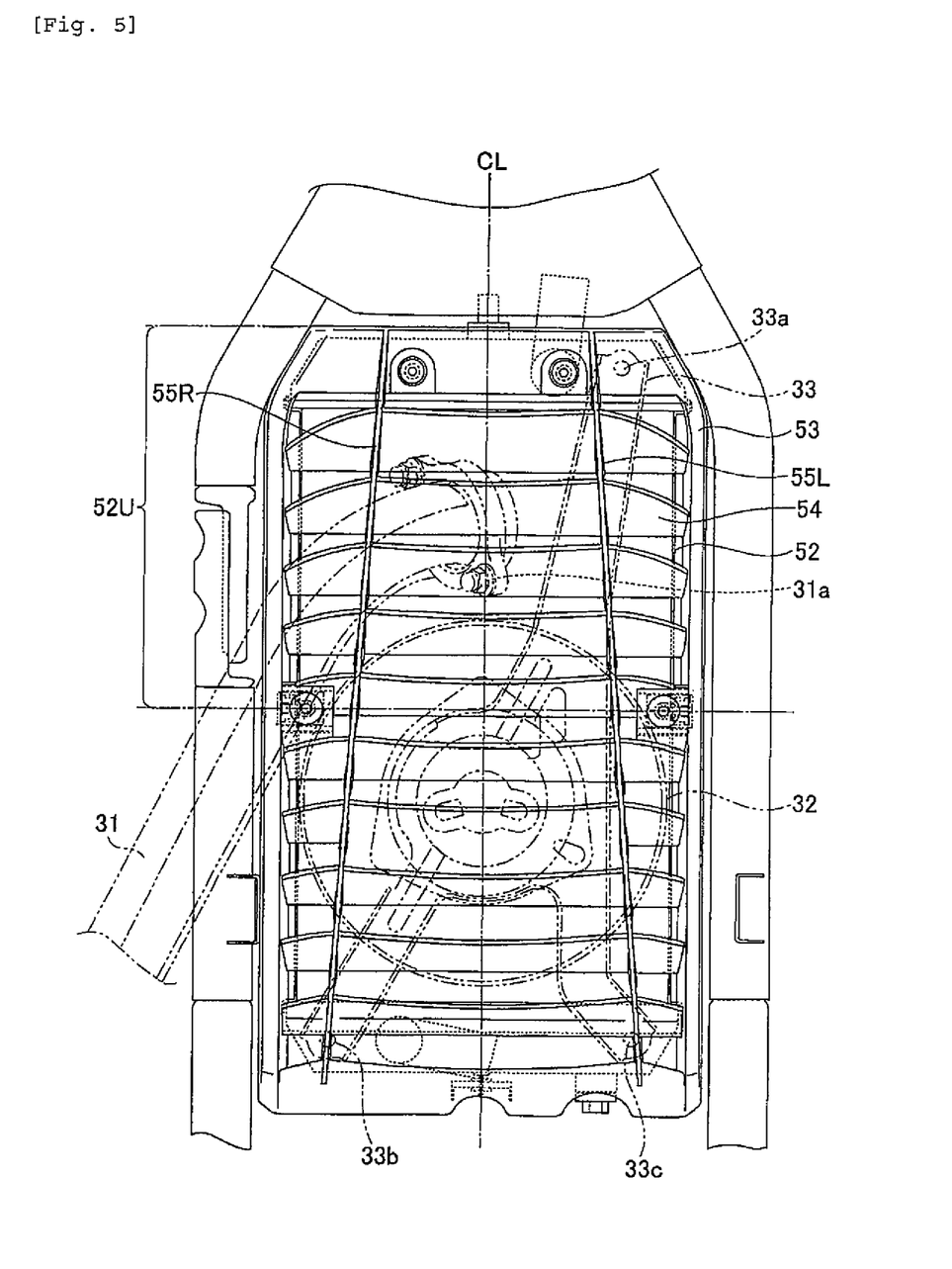
FIG. 5 is a plan view of the neighborhood of the radiator.

The construction of exhaust pipe 31 and cooling fan 32 is now described with reference to FIG. 5. FIG. 5 is a front view, in which imaginary lines indicative of exhaust pipe 31 and cooling fan 32 are added to a periphery of radiator 52.

As viewed from laterally of motorcycle 10, a part of exhaust pipe 31 is provided between radiator upper half 52U and engine 30 (FIG. 2). Also, as shown in FIG. 5, a part of exhaust pipe 31 is provided substantially centrally of radiator 52 in the vehicle width direction.

Cooling fan 32 is provided behind radiator 52 and below the part of exhaust pipe 31 between radiator upper half 52U and engine 30. Cooling fan 32 is also substantially centrally of radiator 52 in the vehicle width direction. Specifically, a center of cooling fan 32 is positioned on a center line CL as viewed from a front of motorcycle 10.

Cooling fan 32 is supported by cooling fan stays 33, which are provided on a rear portion of radiator 52, from rearwardly of cooling fan 32. As viewed from laterally of motorcycle 10, a part of cooling fan stays 33 interposes cooling fan 32 between cooling fan stay 33 and radiator 52, and the remaining cooling fan stays 33 are provided along the rear portion of radiator 52. Cooling fan stays 33 are fixed at left, upper portions 33a, right, lower portions 33b, and left, lower portions 33c to the rear portion of radiator 52.

Louver 53 includes a pair of left and right connecting members 55L and 55R that extend vertically along louver 53 and connect baffle plates 54 together. The distance between connecting members 55R and 55L increases as the connecting members extend vertically downward.

(Mounted State of the Louver)

Figure 6:
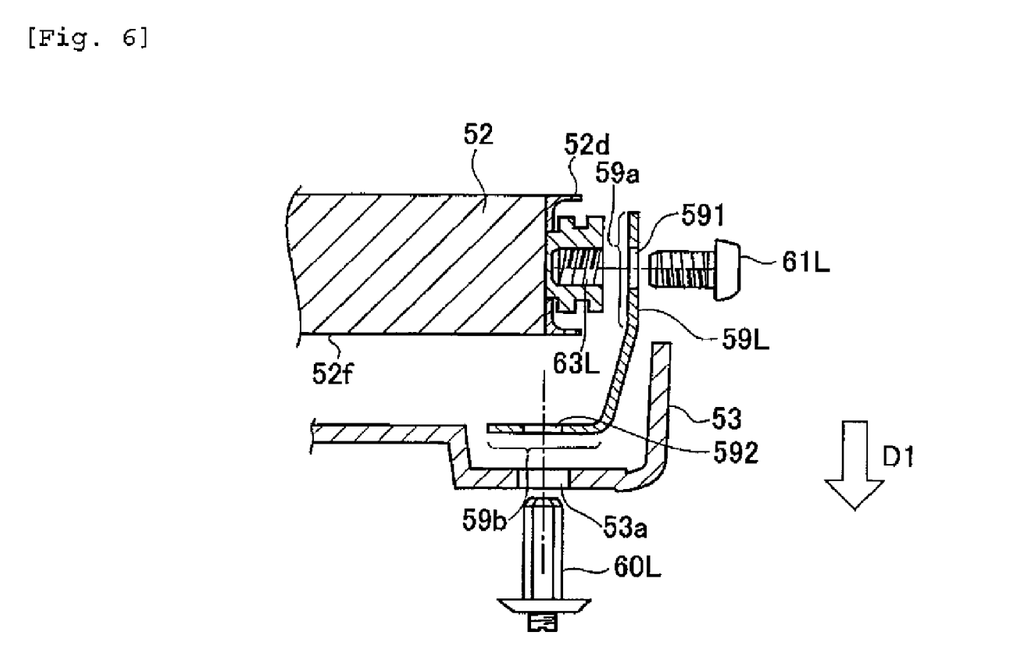
FIG. 6 is a cross sectional view taken along line F6-F6 of FIG. 4.
Figure 7:
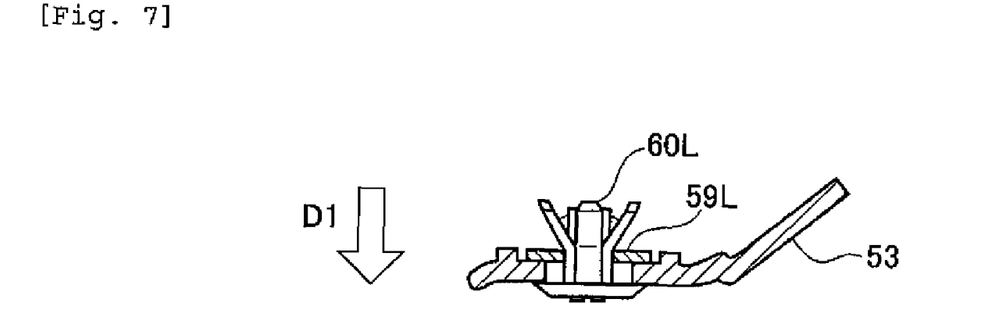
FIG. 7 is a cross sectional view taken along line F7-F7 of FIG. 4.
Figure 8:
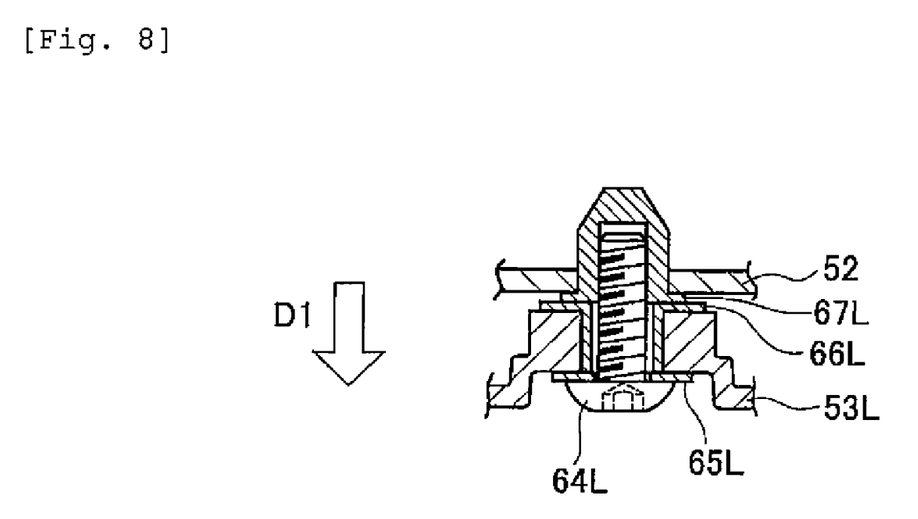
FIG. 8 is a cross sectional view taken along line F8-F8 of FIG. 4.
Figure 9:
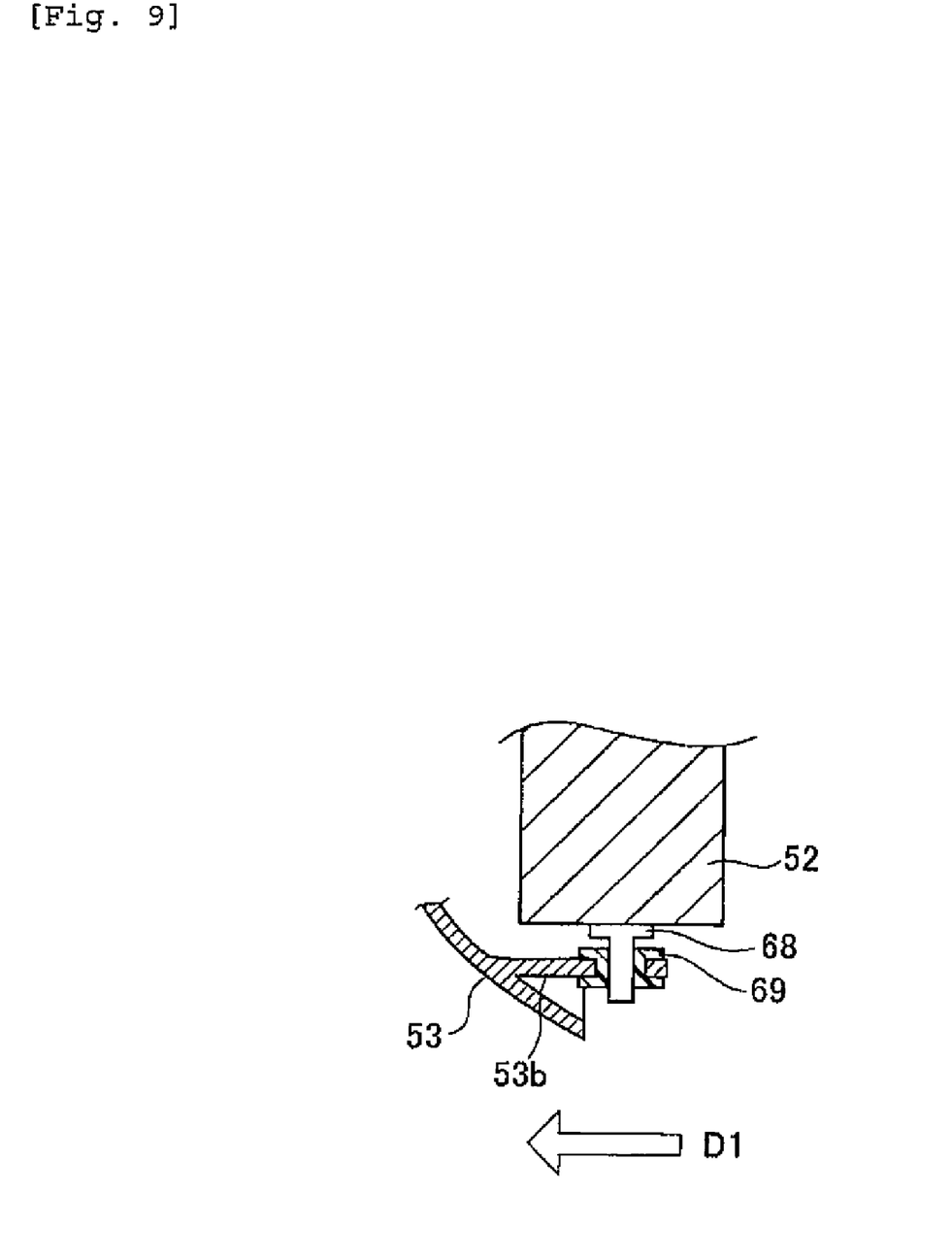
FIG. 9 is a cross sectional view taken along line F9-F9 of FIG. 4.

A mounted state of louver 53 is described with reference to FIGS. 6-9. FIG. 6 is a cross sectional view taken along line F6-F6 of FIG. 4. FIG. 7 is a cross sectional view taken along line F7-F7 of FIG. 4. FIG. 8 is a cross sectional view taken along line F8-F8 of FIG. 4. FIG. 9 is a cross sectional view taken along line F9-F9 of FIG. 4.

A bracket 59L, which is formed to be plate-shaped and substantially L-shaped, is bent along side 52d and front portion 52f of radiator 52. Bracket 59L includes a radiator fixed hole 591 at one end 59a of bracket 59L and a louver fixed hole 592 at the other end 59b of bracket 59L. Bracket end 59a is connected to radiator side 52d. Bracket end 59b overlaps an outer edge of radiator front portion 52f as viewed from a front view of motorcycle 10 and is connected to louver 53 from forwardly of bracket 59L.

A long hole 53a that is lengthy in the vehicle width direction and fixed to bracket 59L is provided on a vertically central, outer edge of louver 53. Louver 53 is connected to bracket end 59b from forwardly of louver 53. A fixation member 63L, into which a bracket mount vis 61L is screwed, is provided on radiator side 52d, which corresponds to long hole 53a of louver 53 centrally in a vertical direction of radiator 52. Bracket mount vis 61L is mounted to fixation member 63L of radiator side 52d through radiator fixed hole 591 of bracket 59L. Rivet 60L is inserted into louver fixed hole 592 of bracket 59L and long hole 53a of louver 53.

As shown in FIG. 8, an upper end of louver 53 is connected to radiator 52 by means of louver mount vis 64L. Radiator 52 includes a hole into which louver mount vis 64L is screwed. Louver 53 includes a hole extending through louver 53 from a front portion thereof to a rear portion thereof. Louver mount vis 64L is connected to an aluminum alloy insert 67L, which is welded to radiator 52, through a washer 65L, the hole of louver 53, and a collar 66L from forwardly (direction D1) of motorcycle 10.

As shown in FIG. 9, a bracket 53b extending in the longitudinal direction from forwardly (direction D1) of motorcycle 10 is provided at a lower end of louver 53. A rubber grommet 69 is press fitted into an opening formed in bracket 53b. A projection 68 formed at the lower end of radiator 52 is connected to louver 53 through grommet 69.

(Function/Effect)

According to the invention, radiator 52 is provided between left and right downtubes 51L and 51R as viewed from a front view of motorcycle 10. Overlapping portion S52 of radiator 52 overlaps downtube 51L as viewed from laterally of motorcycle 10. In this manner, downtubes 51L, 51R protect radiator 52 while suppressing exposure of radiator 52.

Louver 53 is provided on at least a part of radiator 52 to effectively lead traveling wind to radiator 52 and ensure engine cooling efficiency. Thus, engine cooling efficiency is ensured while suppressing exposure of radiator 52 without the provision of a cowling. Motorcycle 10, although provided with a water-cooling type engine, has an outward appearance like that of an American type motorcycle provided with an air-cooling type engine.

Traveling wind passes between front fender 21 and headlight 22 to flow along front fender 21. Since at least a part of baffle plates 54 is directed along straight line L1 between front fender 21 and headlight 22, traveling wind is effectively led to radiator 52, improving engine cooling efficiency. In particular, straight line L1 is tangent to front fender 21. Also, baffle plates 54 are directed in a direction of traveling wind flowing along the upper portion of front fender 21. Therefore, traveling wind flowing along the upper portion of front fender 21 is effectively led to be directed downward.

The width W54 of baffle plates 54 is greater in upper portions of louver 53 relative to lower portions thereof. Baffle plates 54 on the upper side effectively lead traveling wind flowing on an upper end side of front fender 21 to radiator 52, thereby improving cooling efficiency.

Connecting members 55L and 55R connect between upper and lower baffle plates 54 to decrease deformation of baffle plates 54. The distance between connecting members 55R and 55L in the vehicle width direction increases as the connecting members extend downward. Therefore, connecting members 55L and 55R steer clear from the position corresponding to cooling fan 32 behind radiator 52. Thus, deformation of baffle plates 54 is decreased without intercepting leading wind by cooling fan 32. Also, because connecting members 55L and 55R become divergent in shape, a sense of stability as a feature of motorcycle 10 is further emphasized.

Cooling fan 32 cools a lower portion of radiator 52 below exhaust pipe 31. The portion of radiator 52 below exhaust pipe 31, in which traveling wind occurring by baffle plates 54 is restricted as compared with radiator upper half 52U, is cooled by fan 32. Therefore, cooling fan 32 further improves the whole radiator 52 in cooling efficiency. That is, cooling fan 32 cools a lower half of radiator 52 in which traveling wind occurring by baffle plates 54 is restricted.

In order to connect bracket 59L to radiator side 52d, radiator 52 provided between downtubes 51L and 51R is increased in area to a maximum as viewed from a front of motorcycle 10.

If louver 53 were mounted to radiator 52 without through bracket 59L, radiator 52 is constituted by a multiplicity of water tubes (not shown) and a thin metallic plate (not shown), so that it can be fixed to radiator front portion 52f by screws or the like. Accordingly, it would be necessary to mount louver 53 to radiator side 52d from laterally of radiator 52, which takes an increased amount of time because of the presence of downtubes 51L and 51R.

According to the invention, since louver 53 includes bracket 59L connected to radiator side 52d from forwardly of bracket 59L, louver 53 can be readily mounted to radiator 52 from forwardly of motorcycle 10. That is, with bracket 59L, the work of mounting louver 53 is facilitated even though radiator 52 is hidden between downtubes 51L and 51R.

Long hole 53a being lengthy in the vehicle width direction is provided on the front portion of louver 53 to accommodate positional deviation of bracket 59L in the vehicle width direction.

Louver 53 is provided forwardly of downtubes 51L and 51R to effectively lead traveling wind to radiator 52. Distance W1 to the front end of downtube 51L from the front end of louver 53 is shorter than downtube width W51 as viewed from laterally of motorcycle 10. Also, since louver 53 includes an overlapping portion S53 provided along downtubes 51L and 51R, louver 53 is effectively hidden by downtubes 51L and 51R, so that the outward appearance of motorcycle 10 is not diminished. Thus, traveling wind is effectively led to radiator 52 without marring the outward appearance of motorcycle 10.

Since the whole radiator 52 overlaps downtubes 51L and 51R as viewed from laterally of motorcycle 10, exposure of radiator 52 as viewed from laterally of motorcycle 10 is eliminated. And, since louver 53 covers the whole radiator front portion 52f, exposure of radiator 52 as viewed from the front of motorcycle 10 is eliminated.

Other Embodiments

While the invention has been described by way of an embodiment, it is not so limited. Various alternate embodiments will be apparent to those skilled in the art and are within the scope of the invention.

For example, while louver 53 has been described as being provided on the whole front portion of radiator 52, louver 53 may be provided on just a part of the front portion of radiator 52. Similarly, while the whole of radiator 52 has been described as overlapping downtubes 51L and 51R, just a part of radiator 52 may overlap downtubes 51L and 51R.

While straight line L1 along short sides of baffle plates 54 has been described as tangent to front fender 21, line L1 may just pass between front fender 21 and headlight 22.

According to the embodiment of the invention described above, long hole 53a fixed to bracket 59L is provided on the front portion of louver 53 as viewed from a front of motorcycle 10. While the configuration is such that louver 53 and bracket 59L are connected to long hole 53a of louver 53 by means of rivet 60L, which is inserted through louver fixed hole 592 of bracket 59L from forwardly of motorcycle 10, other methods of fixing louver 53 may be used.

In this manner, the invention includes various embodiments not specifically described herein. The scope of the invention is determined by the following claims, as appropriate from the above description.

The invention claimed is:

1. A straddle-type vehicle comprising:
a front wheel;
a front fender provided arcuately along an outer periphery of the front wheel;
a head pipe;
a pair of left and right downtubes extending downward from the head pipe;
a radiator, which catches a traveling wind from forwardly of the vehicle; and
a louver provided on at least a part of the radiator to lead the traveling wind to the radiator, wherein
at least a part of the radiator includes an overlapping portion, which is provided between the pair of left and right downtubes as viewed in front view of the vehicle and overlaps the downtube along the downtube as viewed from laterally of the vehicle,
the louver comprises at least one baffle plate provided in a vehicle width direction, and
a straight line along which the baffle plate is directed is tangent to the front fender generally at a point where an axis of the head pipe crosses the front fender.

2. The straddle-type vehicle according to claim 1, further comprising:
a headlight provided above the front fender, wherein
the louver includes a plurality of baffle plates,
a plurality of baffle plates are provided in the vehicle width direction and aligned at intervals in a vertical direction, and
at least a part of the baffle plates is directed between the front fender and the headlight as viewed from laterally of the vehicle.

3. The straddle-type vehicle according to claim 2, wherein as viewed from laterally of the vehicle, a width of the baffle plates in an upper portion of the louver is greater relative to the width of the baffle plates in a lower portion of the louver.

4. The straddle-type vehicle according to claim 2, wherein the louver includes a pair of connecting members that connect the upper baffle plates and the lower baffle plates together as viewed in front view of the vehicle.

5. The straddle-type vehicle according to claim 4, further comprising:
a rear wheel;
an engine provided rearwardly of the radiator to be used as a power source for the rear wheel;
an exhaust pipe connected to the engine; and
a cooling fan, which sends air to the radiator, wherein
as viewed from laterally of the vehicle, the exhaust pipe is provided between an upper half of the radiator and the engine,
at least a part of the exhaust pipe is provided substantially centrally of the radiator in the vehicle width direction as viewed in front view of the vehicle,
a distance to one of the connecting members from the other of the connecting members in the vehicle width direction enlarges downward from above, and the cooling fan is provided behind the radiator.

6. The straddle-type vehicle according to claim 1, further comprising:
a bracket, at least a part of which is bent,
wherein one end of the bracket is connected to a side of the radiator, and the other end of the bracket is provided in a position overlapping the radiator as viewed in front view of the vehicle.

7. The straddle-type vehicle according to claim 6, wherein the louver is connected to the other end of the bracket from forwardly of the bracket.

8. The straddle-type vehicle according to claim 1, wherein as viewed from laterally of the vehicle, a width of the downtube is greater than a distance to a front end of the downtube from a front end of the louver, and the louver includes an overlapping portion provided along the downtube.

9. The straddle-type vehicle according to claim 1, wherein as viewed from laterally of the vehicle, the whole radiator overlaps the downtube.

10. The straddle-type vehicle according to claim 2, wherein the baffle plates direct a traveling wind flowing along an upper portion of the front fender.

11. An engine cooling mechanism for a motorcycle comprising:
a radiator mounted between downtubes extending from a head pipe of the motorcycle such that at least a part of the radiator is concealed in a side view of the motorcycle;
a louver mounted in front of the radiator to direct traveling wind to the radiator and to conceal at least a part of the radiator in a front view of the motorcycle; and
an exhaust pipe provided to discharge exhaust gases from an engine, wherein a portion of the exhaust pipe extends between the radiator and the engine, the radiator has a cooling fan that cools the radiator, the cooling fan is mounted behind the radiator, the cooling fan is positioned below a location at which the exhaust pipe is coupled to the engine, the louver comprises vertically spaced baffle plates that extend upwardly and forwardly from a front of the louver to capture traveling wind and direct it downward, and baffle plates in an upper portion of the louver have a greater width than baffle plates in a lower portion of the louver.

12. The engine cooling mechanism according to claim 11, and further comprising connecting members extending vertically along and connecting the baffle plates.

13. The engine cooling mechanism according to claim 12, wherein there are two connecting members, and a spacing between the connecting members becomes greater from an upper portion of the louver to a lower portion of the louver.

14. An engine cooling mechanism for a motorcycle comprising:

a radiator mounted between downtubes extending from a head pipe of the motorcycle such that at least a part of the radiator is concealed in a side view of the motorcycle;

a louver mounted in front of the radiator to direct traveling wind to the radiator and to conceal at least a part of the radiator in a front view of the motorcycle; and an exhaust pipe provided to discharge exhaust gases from an engine, wherein a portion of the exhaust pipe extends between the radiator and the engine, the radiator has a cooling fan that cools the radiator, the cooling fan is mounted behind the radiator, the cooling fan is positioned below a location at which the exhaust pipe is coupled to the engine, and a bracket couples the louver to the radiator, and the bracket is L-shaped and includes one end fastened to a side of the radiator and another end that wraps around the front of the radiator and is fastened to the louver.

15. A motorcycle comprising the engine cooling mechanism of claim 11.

* * * * *